(12) United States Patent
Takahashi et al.

(10) Patent No.: US 11,240,447 B2
(45) Date of Patent: Feb. 1, 2022

(54) SOLID IMAGING APPARATUS, CONTROL METHOD OF SOLID IMAGING APPARATUS, AND COMPUTER PROGRAM

(71) Applicant: Sony Semiconductor Solutions Corporation, Kanagawa (JP)

(72) Inventors: Tomohiro Takahashi, Kanagawa (JP); Takahiro Ilnuma, Kanagawa (JP); Hiroshi Sumihiro, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/762,626

(22) PCT Filed: Oct. 10, 2018

(86) PCT No.: PCT/JP2018/037804
§ 371 (c)(1),
(2) Date: May 8, 2020

(87) PCT Pub. No.: WO2019/111528
PCT Pub. Date: Jun. 13, 2019

(65) Prior Publication Data
US 2020/0280689 A1   Sep. 3, 2020

(30) Foreign Application Priority Data
Dec. 6, 2017 (JP) .............................. JP2017-234218

(51) Int. Cl.
*H04N 5/353* (2011.01)
*H04N 5/378* (2011.01)

(52) U.S. Cl.
CPC ............. *H04N 5/353* (2013.01); *H04N 5/378* (2013.01)

(58) Field of Classification Search
CPC ........ H04N 5/225; H04N 5/232; H04N 5/343; H04N 5/345; H04N 5/353; H04N 5/3532; H04N 5/374; H04N 5/378; H04N 5/379
See application file for complete search history.

(56) References Cited

U.S. PATENT DOCUMENTS

| 9,571,742 B2 * | 2/2017 | Watanabe .......... H04N 5/35581 |
| 2015/0172595 A1 * | 6/2015 | Furumochi ........ H04N 5/23245 348/216.1 |

FOREIGN PATENT DOCUMENTS

| JP | 2015-119206 A | 6/2015 |
| JP | 2017-126894 A | 7/2017 |
| JP | 2017-138434 A | 8/2017 |

* cited by examiner

*Primary Examiner* — Lin Ye
*Assistant Examiner* — Chriss S Yoder, III
(74) *Attorney, Agent, or Firm* — Michael Best & Friedrich LLP

(57) ABSTRACT

[Problem] To provide a solid imaging apparatus that is able to shorten the time from the detection of an object to the completion of imaging processing.
[Solution] A solid imaging apparatus includes a control unit that controls a shutter operation for a pixel area having a plurality of pixels arranged in matrix, and a reading operation from the pixel area at a first reading speed and a second reading speed. The control unit starts the shutter operation for at least one row of the pixel area after the reading operation at the first reading speed is completed, and during execution of detection processing of an object read from the pixel area.

20 Claims, 18 Drawing Sheets

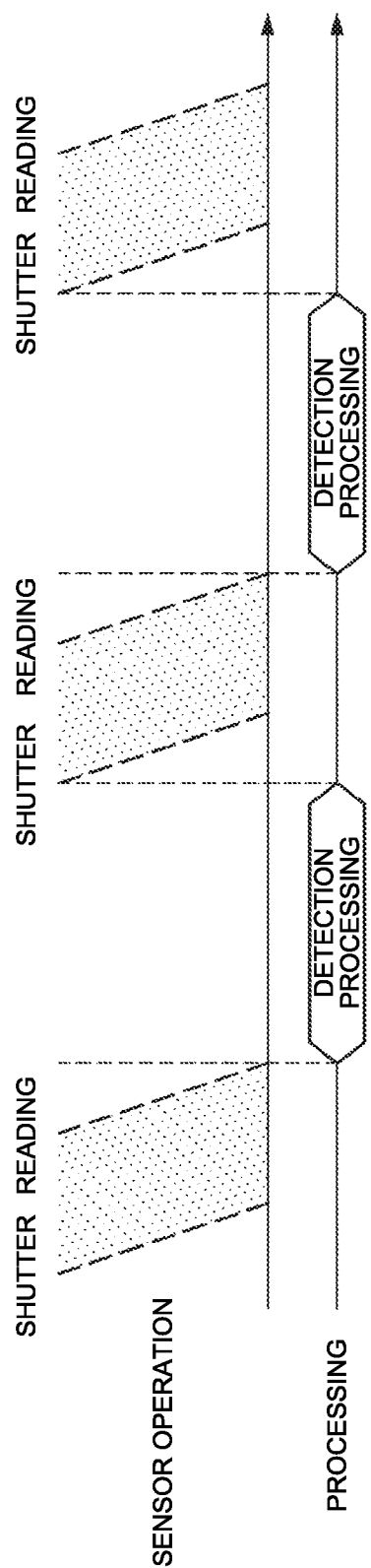

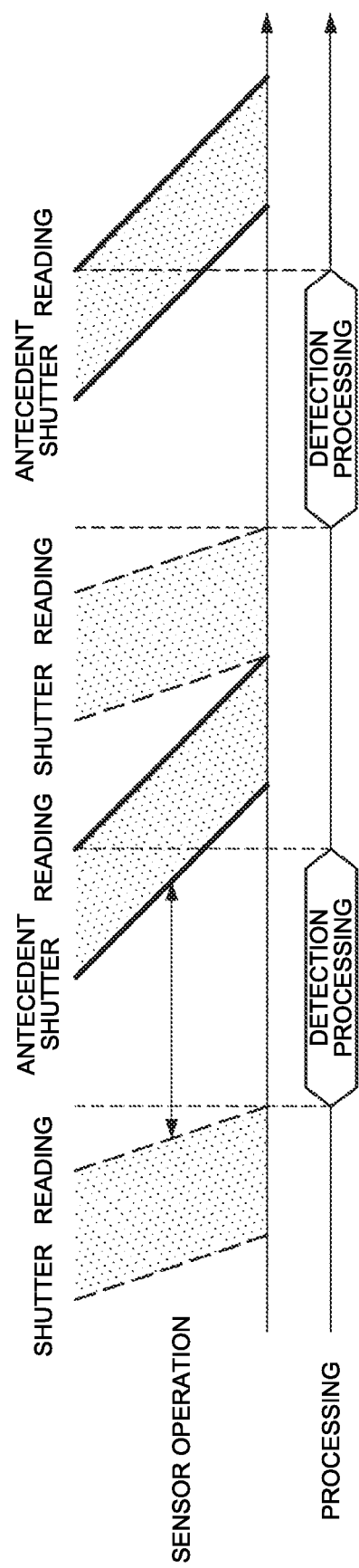

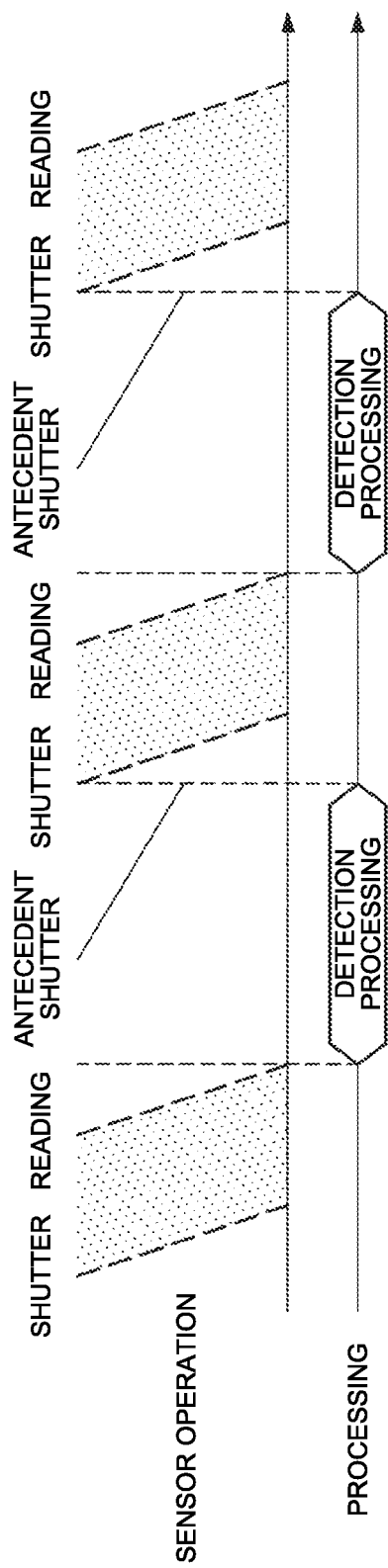

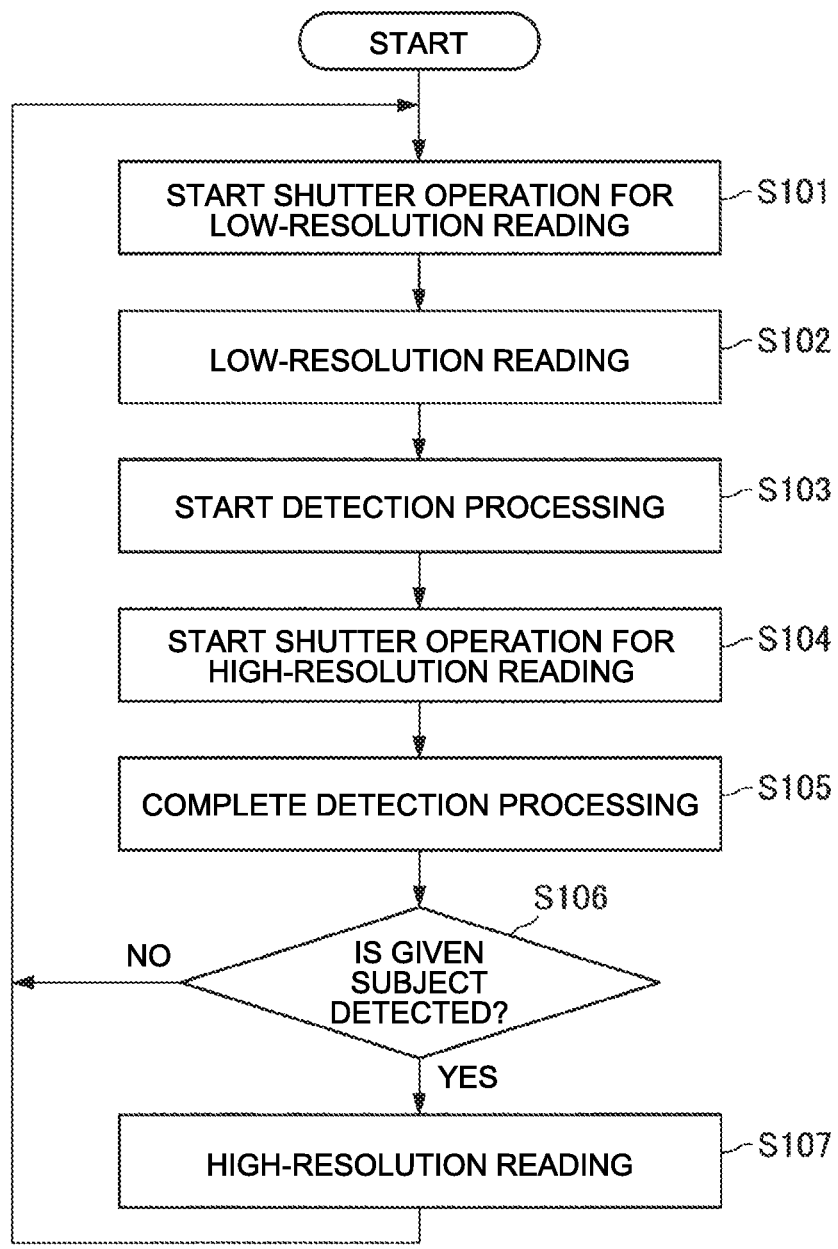

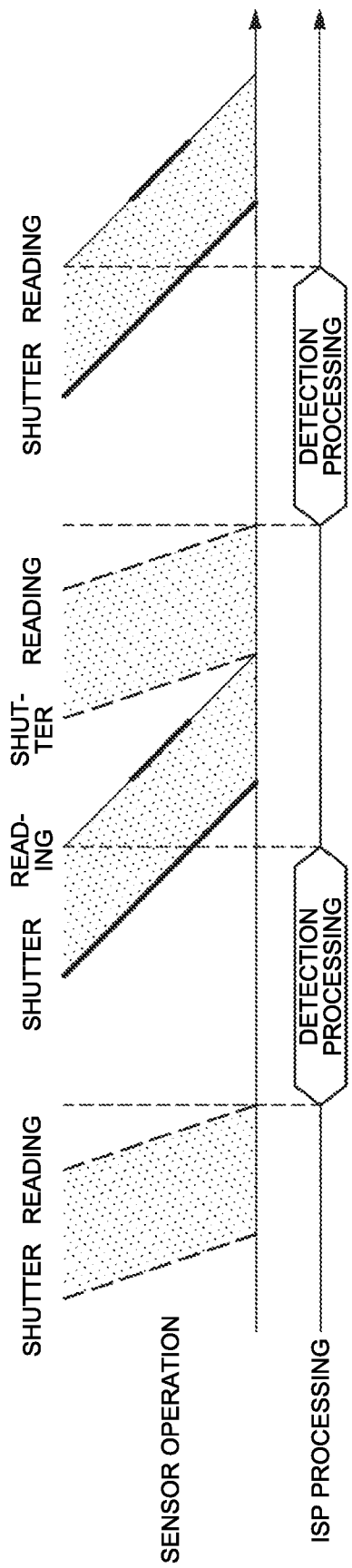

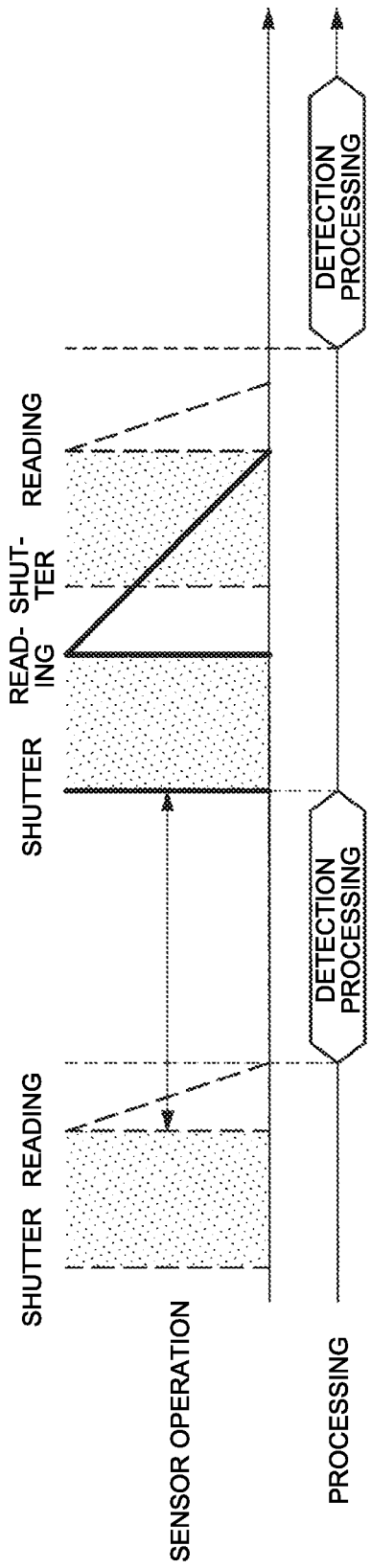

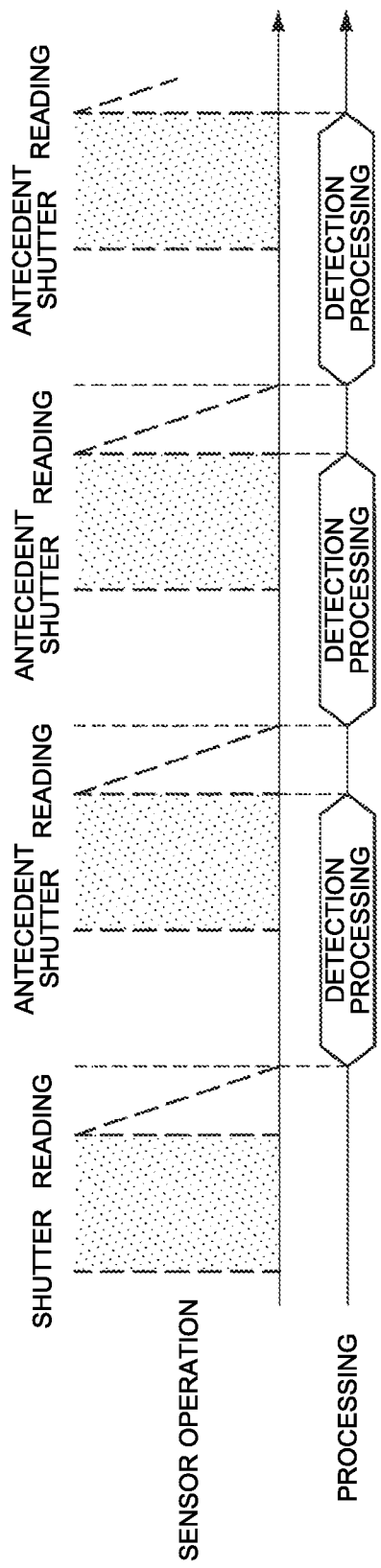

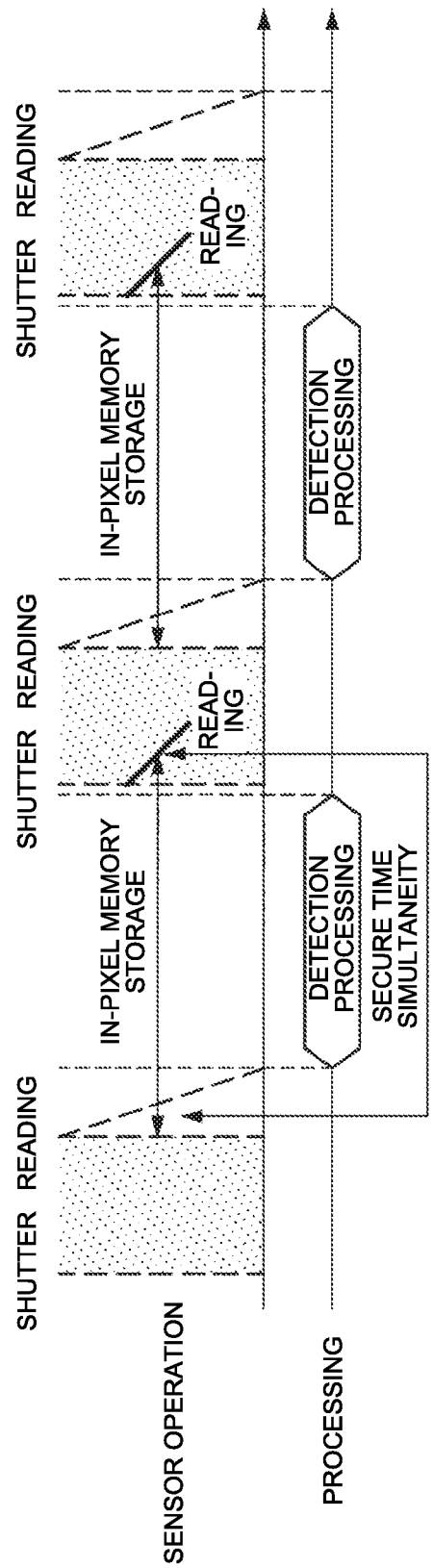

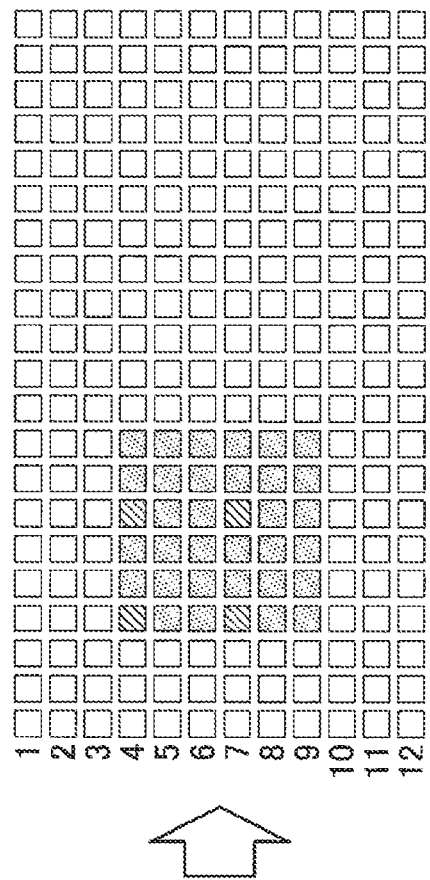
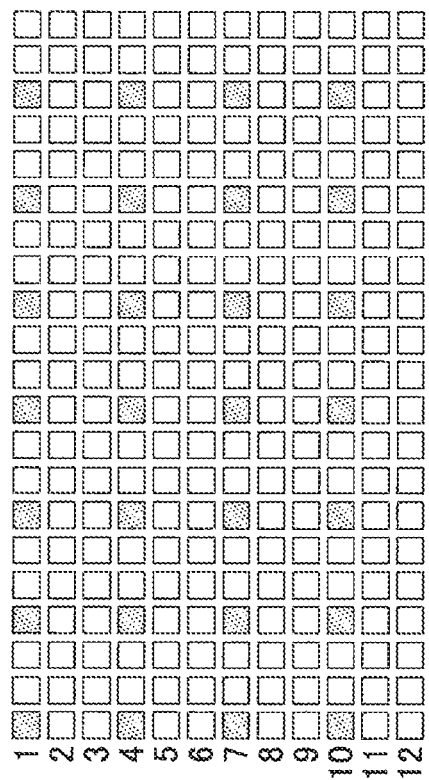
FIG.13B

SOLID IMAGING APPARATUS, CONTROL METHOD OF SOLID IMAGING APPARATUS, AND COMPUTER PROGRAM

FIELD

The present disclosure relates to a solid imaging apparatus, a control method of the solid imaging apparatus, and a computer program.

BACKGROUND

A technique of an imaging apparatus that, once detecting the presence of a predetermined object in data that is periodically read from at least a part of pixels within an image sensor, starts imaging processing of reading the data from the image sensor is disclosed in, for example, Patent Literature 1 or the like.

CITATION LIST

Patent Literature

Patent Literature 1: JP 2017-126894 A

SUMMARY

Technical Problem

Detection processing for detecting a predetermined object requires a predetermined time. Accordingly, a shutter operation of an image sensor starts after the completion of the detection processing, the time from the detection of an object to the completion of imaging processing will be long. As the time from the detection of the object to the completion of the imaging processing becomes longer, in some cases, the detected object may fail to be shown on an image that is obtained by the imaging processing.

Thus, the present disclosure proposes a novel and improved solid imaging apparatus that is able to shorten the time from the detection of an object to the completion of imaging processing, a control method of the solid imaging apparatus, and a computer program.

Solution to Problem

According to the present disclosure, a solid imaging apparatus is provided that includes a control unit that controls a shutter operation for a pixel area having a plurality of pixels arranged in matrix, and a reading operation from the pixel area at a first reading speed and a second reading speed, wherein the control unit starts the shutter operation for at least one row of the pixel area after the reading operation at the first reading speed is completed, and during execution of detection processing of an object read from the pixel area by the reading operation at the first reading speed.

Moreover, according to the present disclosure, a control method of a solid imaging apparatus is provided that includes the steps of causing a processor to: control a shutter operation for a pixel area having a plurality of pixels arranged in matrix, and a reading operation from the pixel area at a first reading speed; and start the shutter operation for at least one row of the pixel area during the detection processing of an object that is read from the pixel area, and control a reading operation from the pixel area at a second reading speed.

Moreover, according to the present disclosure, a computer program is provided that causes a computer to: control a shutter operation for a pixel area having a plurality of pixels arranged in matrix, and a reading operation from the pixel area at a first reading speed; and start the shutter operation for at least one row of the pixel area during the execution of the detection processing of an object that is read from the pixel area, and control a reading operation from the pixel area at a second reading speed.

Advantageous Effects of Invention

As has been described above, according to the present disclosure, a novel and improved solid imaging apparatus that is able to shorten the time from the detection of an object to the completion of imaging processing, a control method of the solid imaging apparatus, and a computer program can be provided.

The above-described effects are not necessarily limited, and any effects indicated in the present specification or other effects that can be understood from the present specification may be exerted together with or instead of the above-described effects.

BRIEF DESCRIPTION OF DRAWINGS

FIG. 4B is an explanatory diagram for describing an operation example of the solid imaging apparatus 1.

FIG. 5A is an explanatory diagram for describing an operation example of the solid imaging apparatus 1.

FIG. 5B is an explanatory diagram for describing an operation example of the solid imaging apparatus 1.

FIG. 6 a flowchart illustrating an operation example of the solid imaging apparatus 1 according to an embodiment of the present disclosure.

FIG. 7 an explanatory diagram for describing an operation example of the solid imaging apparatus 1.

FIG. 9A is an explanatory diagram for describing an operation example of the solid imaging apparatus 1.

FIG. 10B is an explanatory diagram for describing an operation example of the solid imaging apparatus 1.

FIG. 12 is an explanatory diagram for describing an operation example of the solid imaging apparatus 1.

FIG. 13B is an explanatory diagram for describing low-resolution reading and high-resolution reading by the solid imaging apparatus 1.

DESCRIPTION OF EMBODIMENTS

The following describes preferable embodiments of the present disclosure in detail with reference to the attached drawings. In the present specification and the drawings, overlap of descriptions will be avoided by providing the same reference signs for constituent elements having substantially the same functional configuration.

Descriptions will be constituted in the following order.
1. Embodiment of Present Disclosure
1.1. Schematic Configuration
1.2. Functional Configuration Example
1.3. Operation Example
2. Summary <1. Embodiment of Present Disclosure>
<1.1. Schematic Configuration>

Figure 1:
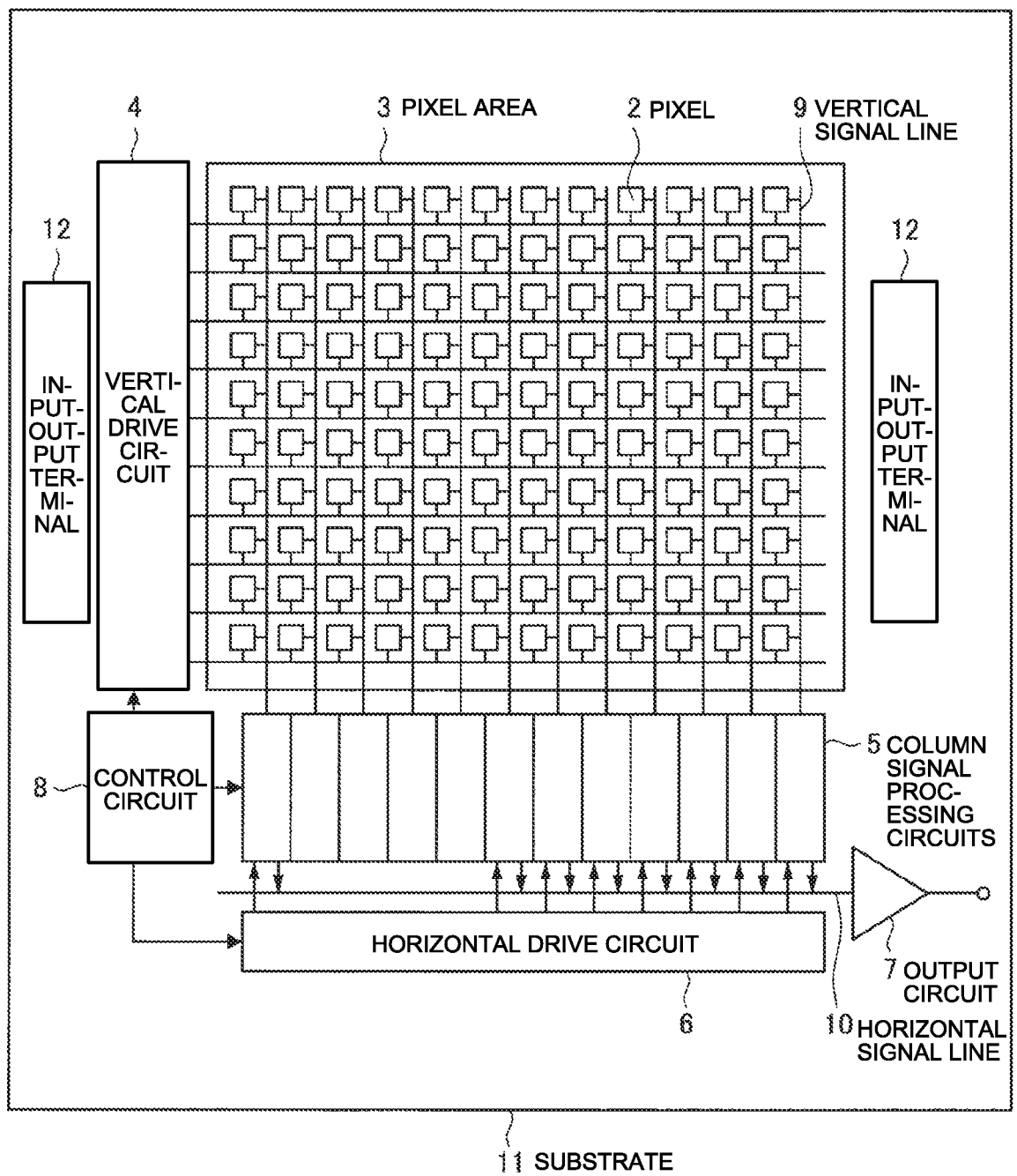
FIG. 1 is an explanatory diagram illustrating a schematic configuration of a CMOS solid imaging apparatus.

FIG. 1 illustrates a schematic configuration of a CMOS solid imaging apparatus as an example of a configuration of a solid imaging apparatus according to an embodiment of the present disclosure. This CMOS solid imaging apparatus is applied to a solid imaging apparatus of each embodiment. As illustrated in FIG. 1, a solid imaging apparatus 1 of the present embodiment is formed by providing a pixel array (what is called a pixel area) 3 having a plurality of pixels 2 including photoelectric conversion parts regularly arranged in the state of a two-dimensional array, and a peripheral circuit part, on a semiconductor substrate 11 that is, for example, a silicon substrate. The pixels 2 include, for example, photodiodes that become the photoelectric conversion parts, and a plurality of pixel transistors (what is called MOS transistors). The pixel transistors can be composed of three transistors that are, for example, a transfer transistor, a reset transistor, and an amplification transistor. Other than these, the pixel transistors can be composed of four transistors by adding a selection transistor. An example of an equivalent circuit of a unit pixel will be separately described later. The pixels 2 may be formed as one unit pixel. In addition, the pixels 2 may also have a shared pixel structure. This shared pixel structure is composed of a plurality of photodiodes, a plurality of transfer transistors, one shared floating diffusion, and one each of shared other pixel transistors. That is to say, in a shared pixel, the photodiodes and the transfer transistors forming a plurality of unit pixels share one each of the other pixel transistors.

The peripheral circuit part includes a vertical drive circuit 4, column signal processing circuits 5, a horizontal drive circuit 6, an output circuit 7, and a control circuit 8.

The control circuit 8 receives an input clock, data commanding an operation mode, and the like, and outputs data such as internal information on the solid imaging apparatus. That is to say, the control circut 8 generates clock signals and control signals serving as the references of operations of the vertical drive circuit 4, the column signal processing circuits 5, the horizontal drive circuit 6, and the like, based on a vertical synchronizing signal, a horizontal synchronizing signal, and a master clock. Then, these signals are input to the vertical drive circuit 4, the column signal processing circuits 5, the horizontal drive circuit 6, and the like.

The vertical drive circuit 4 is constituted of, for example, a shift register. The vertical drive circuit 4 selects pixel driving wiring, and supplies a pulse for driving a pixel to the selected pixel driving wiring to drive pixels in row units. Specifically, the vertical drive circuit 4 sequentially performs selection scanning in the vertical direction on each of the pixels 2 of the pixel array 3 in row units, and supplies a pixel signal based on a signal charge that is generated in accordance with the amount of light received in, for example, a photodiode that becomes the photoelectric conversion part of each of the pixels 2 to the column signal processing circuit 5 through a vertical signal line 9.

The column signal processing circuit 5 is arranged in, for example, each line of the pixels 2. The column signal processing circuit 5 performs signal processing such as noise elimination for each pixel line, on a signal that is output from one row of the pixels 2. Specifically, the column signal processing circuit 5 performs signal processing such as CDS for eliminating fixed pattern noise specific to the pixels 2, signal amplification, and AD conversion. A horizontal selection switch (not illustrated) is provided to an output stage of the column signal processing circuit 5 by being connected between a horizontal signal line 10 and the output stage.

The horizontal drive circuit 6 is constituted of, for example, a shift register. The horizontal drive circuit 6 selects the column signal processing circuits 5 in order by sequentially outputting horizontal scanning pulses, and causes each column signal processing circuit 5 to output a pixel signal to the horizontal signal line 10.

The output circuit 7 performs signal processing on signals that are sequentially supplied from the column signal processing circuits 5 through the horizontal signal line 10, and outputs the processed signals. For example, the output circuit 7 may perform buffering alone, or may perform black level adjustment, line variation correction, various kinds of digital signal processing, or the like. An input-output terminal 12 exchanges signals with the outside.

Figure 2:
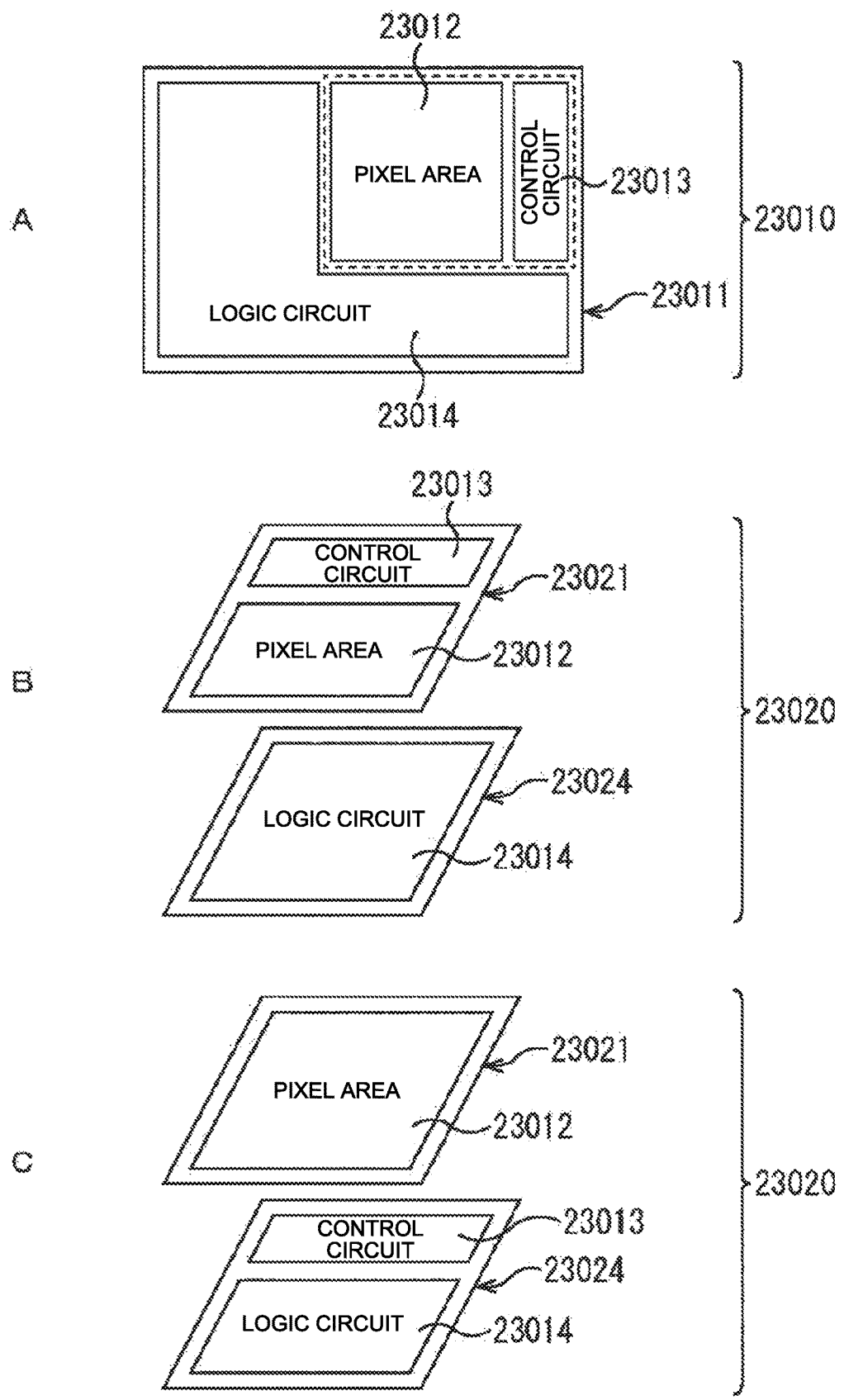
FIG. 2 is a diagram illustrating an overview of a configuration example of a laminated solid imaging apparatus to which the technique according to the present disclosure can be applied.

In addition, FIG. 2 is a diagram illustrating an overview of a configuration example of a laminated solid imaging apparatus to which the technique according to the present disclosure can be applied.

A of FIG. 2 illustrates a schematic configuration example of a non-laminated solid imaging apparatus. As illustrated in A of FIG. 2, a solid imaging apparatus 23010 includes one sheet of die (semiconductor substrate) 23011. The die 23011 has thereon a pixel area 23012 having pixels arranged in an array, a control circuit 23013 that drives pixels and other various kinds of control, and a logic circuit 23014 for performing signal processing.

B and C of FIG. 2 illustrate schematic configuration examples of a laminated solid imaging apparatus. As illustrated in B and C of FIG. 2, a solid imaging apparatus 23020 is configured as one semiconductor chip by electrically connecting laminated two sheets of dies that are a sensor die 23021 and a logic die 23024.

In B of FIG. 2, the sensor die 23021 has thereon the pixel area 23012 and the control circuit 23013, and the logic die 23024 has thereon the logic circuit 23014 including a signal processing circuit for performing signal processing.

In C of FIG. 2, the sensor die 23021 has thereon the pixel area 23012, and the logic die 23024 has thereon the control circuit 23013 and the logic circuit 23014.

The logic circuit 23014 illustrated in FIG. 2 executes detection processing, which will be described in detail below. As a result of the detection processing by the logic circuit 23014, the control circuit 23013 drives pixels on the pixel area 23012.

<1.2. Functional Configuration Example>

Figure 3:
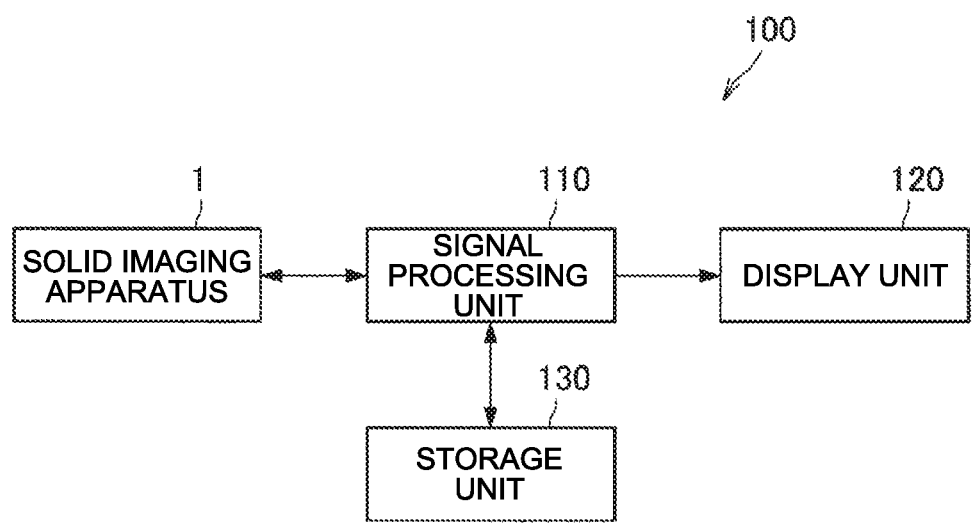
FIG. 3 is an explanatory diagram illustrating a functional configuration example of an imaging apparatus 100 according to an embodiment of the present disclosure.

The following describes a functional configuration example of an imaging apparatus 100 that has thereon the solid imaging apparatus 1 according to an embodiment of the present disclosure. FIG. 3 is an explanatory diagram that illustrates a functional configuration example of the imaging apparatus 100 according to the embodiment of the present disclosure. The imaging apparatus 100 illustrated in FIG. 3 is an apparatus that can be used as, for example, a monitoring camera. The imaging apparatus 100 is an apparatus that is configured to regularly perform detection processing of a certain object, and execute imaging processing based on a detection result.

As illustrated in FIG. 3, the imaging apparatus 100 according to the embodiment of the present disclosure includes the solid imaging apparatus 1, a signal processing unit 110, a display unit 120, and a storage unit 130.

The signal processing unit 110 executes signal processing on data that is output from the solid imaging apparatus 1. Accordingly, the signal processing unit 110 may be constituted of a predetermined processor. Specifically, the signal processing unit 110 executes image generation processing by using the data output from the solid imaging apparatus 1. The signal processing unit 110 outputs a generated image to the display unit 120, or stores the generated image in the storage unit 130. In the present embodiment, the detection processing of the object is executed in the solid imaging apparatus 1. However, the present disclosure is not limited to such example. For example, the detection processing of the object may be executed in the signal processing unit 110.

The display unit 120 is constituted of a display device such as a liquid crystal display or an organic EL display, and the display unit 120 displays various kinds of information, for example, an image that is imaged by the solid imaging apparatus 1. In addition, the storage unit 130 is constituted of a storage device such as an ROM or an RAM, and the storage unit 130 stores therein various computer programs, settings, and the like for operating the imaging apparatus 100. Furthermore, the storage unit 130 stores therein image data that is imaged by the solid imaging apparatus 1 and is generated by the signal processing unit 110.

<1.3. Operation Example>

(In the case of Rolling Shutter)

The following describes an operation example of the solid imaging apparatus 1 according to an embodiment of the present disclosure. Firstly, before describing the operation example of the solid imaging apparatus 1 according to the embodiment of the present disclosure, the following describes operations in the case of starting a shutter operation of the solid imaging apparatus 1 and obtaining image data after the completion of detection processing using an image that is imaged by the solid imaging apparatus 1. In the following descriptions, the solid imaging apparatus 1 performs imaging in a rolling shutter method, specifically, a method of sequentially exposing each row of pixels.

Figure 4A:
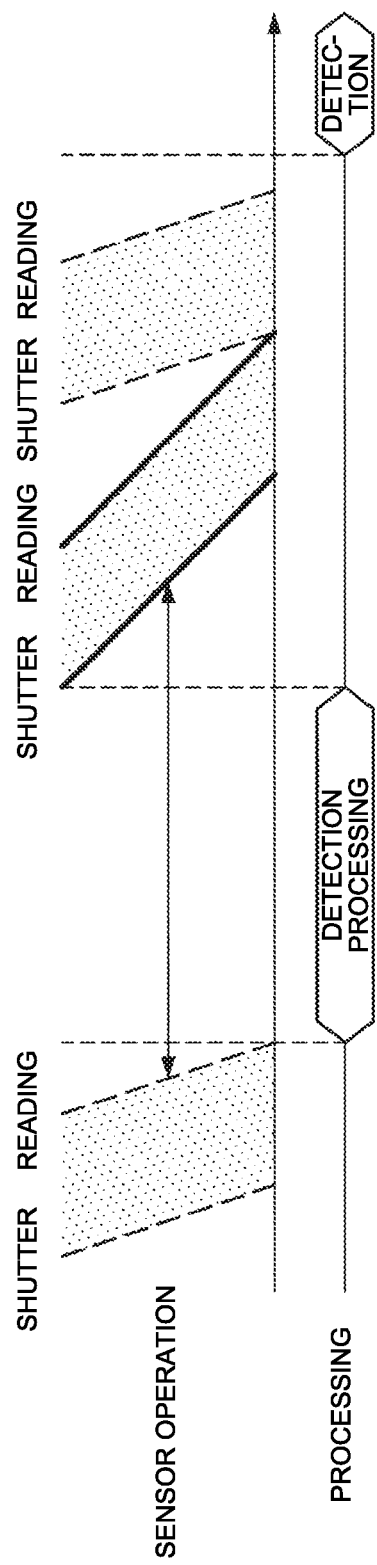
FIG. 4A is an explanatory diagram for describing an operation example of a solid imaging apparatus 1.

FIG. 4A and FIG. 4B are explanatory diagrams for describing the operation example of the solid imaging apparatus 1. Among the sensor operations in FIG. 4A, those illustrated with broken lines are shutters and reading operations for detecting an object to be detected, and those illustrated with solid lines are shutters and reading operations when such object to be detected is present. In the following similar drawings, those illustrated as sensor operations represent shutters and reading operations from the top row to the bottom row of pixels.

Detection of an object from data that is read from the solid imaging apparatus 1 does not require use of all pixels. Shutter operations and reading operations that are limited to a part of rows or areas may be performed. Accordingly, shutters and reading operations for detecting the object operate at a higher speed than in shutter and reading operations when the object to be detected is present. Shutters and reading operations for detecting the object will be collectively referred to as the low-resolution reading, and shutters and reading operations when the object to be detected is present will be collectively referred to as the high-resolution reading. In the present embodiment, the speed of shutters and reading operations for detecting the object and the speed of shutters and reading operations when the object is present are varied. However, the present disclosure is not limited to such embodiment, and each of the operations may be performed at the same speed.

FIG. 4A is an operation example of the solid imaging apparatus 1 when executing the high-resolution reading once an object to be detected is detected in the first detection processing, and executing the low-resolution reading after the high-resolution reading. In addition, FIG. 4B is an operation example of the solid imaging apparatus 1 when an object to be detected cannot be detected by the detection processing. It should be noted that, in the following figures, the time required for the low-resolution reading, the high-resolution reading, or the detection processing is merely an example.

When a shutter operation of the solid imaging apparatus 1 is started and image data is obtained after the completion of the detection processing using an image that is imaged by the solid imaging apparatus 1, in both cases of FIG. 4A and FIG. 4B, the low-resolution reading or the high-resolution reading cannot be executed until the detection processing is completed. In particular, since the high-resolution reading requires a longer operation time as compared with the low-resolution reading, even if an object to be detected is detected as a result of the detection processing, the object may fail to be shown on the image depending on the moving speed of the object despite the high-resolution reading.

Thus, the solid imaging apparatus 1 according to the present embodiment performs the low-resolution reading, and executes a shutter operation for the high-resolution reading while performing the detection processing using data by the low-resolution reading. In this manner, by antecedently executing the shutter operation for the high-resolution reading, the solid imaging apparatus 1 according to the present embodiment can shorten the time from the detection of the object to the completion of imaging processing.

FIG. 5A and FIG. 5B are explanatory diagrams for describing operation examples of the solid imaging apparatus 1. FIG. 5A is an operation example of the solid imaging apparatus 1 when the high-resolution reading is executed in the case where an object to be detected can be detected in the first detection processing, and the low-resolution reading is executed after the high-resolution reading. In addition, FIG. 5B is an operation example of the solid imaging apparatus 1 when an object to be detected cannot be detected by the detection processing.

As illustrated in FIG. 5A, it is not the case that the solid imaging apparatus 1 according to an embodiment of the present disclosure starts the shutter operation for the high-resolution reading only when the detection processing is completed, but the solid imaging apparatus 1 executes the shutter operation for the high-resolution reading during the execution of the detection processing, regardless of a detection result by the detection processing. While start timing of the shutter operation for the high-resolution reading is in the detection processing in FIG. 5A, as long as the high-resolution reading is performed in any one of the rows with the detection processing being performed, and reading processing from pixels in the top row can be started immediately after the detection processing is completed and the object is determined to be detected, the start timing of the shutter operation for the high-resolution reading does not matter.

Furthermore, as illustrated in FIG. 5A, the solid imaging apparatus 1 starts a shutter operation for the low-resolution reading again while the high-resolution reading has been performed. In FIG. 5A, the shutter operation for the low-resolution reading is started while the high-resolution reading has been performed such that the end of the high-resolution reading operation overlaps with the end of the shutter operation for the low-resolution reading. However, the start timing of the shutter operation for the low-resolution reading is also not limited to that illustrated in FIG. 5A.

By contrast, when the object to be detected cannot be detected by the detection processing, as illustrated in FIG. 5B, the solid imaging apparatus 1 stops the shutter operation in the high-resolution reading at the end of the detection processing, and starts the shutter operation for the low-resolution reading again after discarding charges accumulated in pixels by the shutter operation in the high-resolution reading.

FIG. 6 is a flowchart illustrating an operation example of the solid imaging apparatus 1 according to an embodiment of the present disclosure. FIG. 6 is an operation example of the solid imaging apparatus 1 in the case of determining whether an object to be detected is present in an image that is imaged by the solid imaging apparatus 1, and imaging an image of the high-resolution if such object is present. The following describes the operation example of the solid imaging apparatus 1 according to the embodiment of the present disclosure with reference to FIG. 6.

In order to perform the detection processing, the solid imaging apparatus 1 firstly starts the shutter operation for the low-resolution reading (Step S101), and as the low-resolution reading, reads data accumulated in pixels by the shutter operation (Step S102).

Subsequently, the solid imaging apparatus 1 starts the detection processing of an object using an image by the low-resolution reading (Step S103). Then, the solid imaging apparatus 1 starts the shutter operation for the high-resolution reading before the completion of the detection processing of the object (Step S104).

Subsequently, the solid imaging apparatus 1 completes the detection processing of the object using the image by the low-resolution reading (Step S105), and determines whether a predetermined object to be detected is detected (Step S106). If such predetermined object to be detected is detected (Yes at Step S106), the solid imaging apparatus 1 reads data accumulated in the pixels by the shutter operation for the high-resolution reading (Step S107). Once the solid imaging apparatus 1 reads the data accumulated in the pixels, the operation returns to the shutter operation for the low-resolution reading at Step S101. By contrast, if such predetermined object to be detected is not detected (No at Step S106), the solid imaging apparatus 1 discards the data accumulated in the pixels by the shutter operation for the high-resolution reading, and the operation returns to the shutter operation for the low-resolution reading at Step S101.

When the solid imaging apparatus 1 detects the object to be detected by the detection processing of the object using the image by the low-resolution reading, reading may be partially performed at the time of the high-resolution reading. FIG. 7 is an explanatory diagram for describing an operation example of the solid imaging apparatus 1. In this manner, when detecting the object to be detected, the solid imaging apparatus 1 does not necessarily need to execute reading for all of the rows at the time of the high-resolution reading, but may execute reading partially for an area that includes the portion where the object is detected (attention area (ROI: Region-of-Interest)).

When the object to be detected is not detected by the detection processing of the object using the image by the low-resolution reading, the solid imaging apparatus 1 may continue the shutter operation for the high-resolution reading that has been antecedently executed, and may execute reading of the data accumulated in the pixels in low-resolution, specifically, may execute the reading operation for a part of the pixels.

Figure 8:
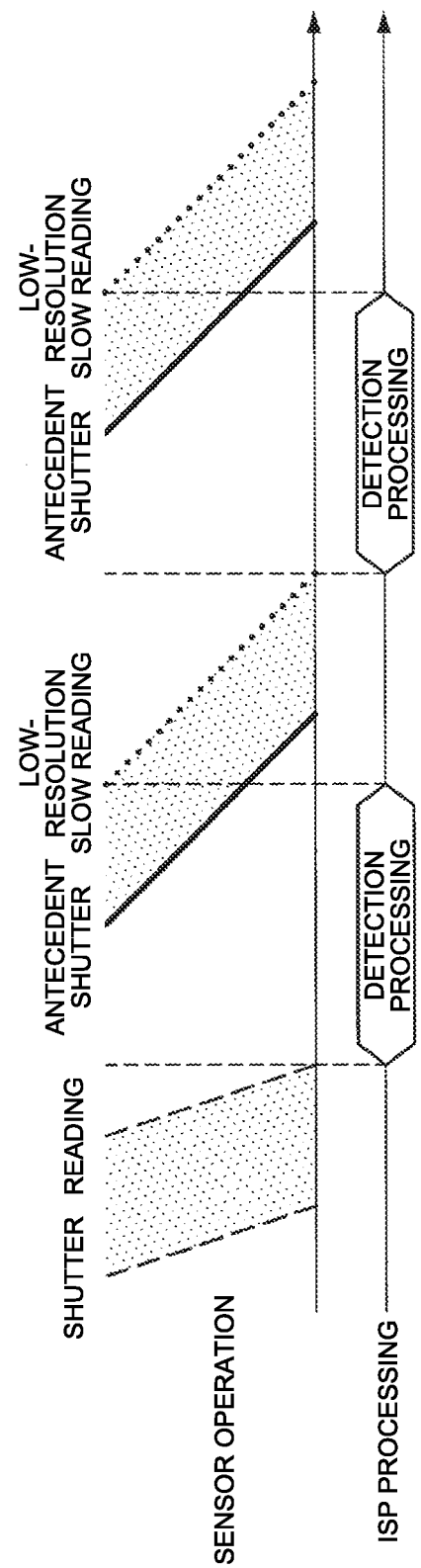
FIG. 8 is an explanatory diagram for describing an operation example of the solid imaging apparatus 1.

FIG. 8 is an explanatory diagram for describing an operation example of the solid imaging apparatus 1. As illustrated in FIG. 8, when failing to detect the object to be detected, the solid imaging apparatus 1 may continue the shutter operation for the high-resolution reading that has been antecedently executed, and may execute the reading operation for a part of the pixels. The solid imaging apparatus 1 may match the reading speed at that time with that of the shutter operation for the high-resolution reading.

(In the Case of Global Shutter)

The foregoing has described the case in which the solid imaging apparatus 1 performs imaging by a rolling shutter method that sequentially exposes each row of pixels. The following describes a case in which the solid imaging apparatus 1 performs imaging by a global shutter method that exposes all the pixels at once.

Firstly, before describing an operation example of the solid imaging apparatus 1 according to an embodiment of the present disclosure, the following will describe operations when image data is obtained by starting the shutter operation of the solid imaging apparatus 1 after the completion of detection processing using an image that is imaged by the solid imaging apparatus 1.

Figure 9B:
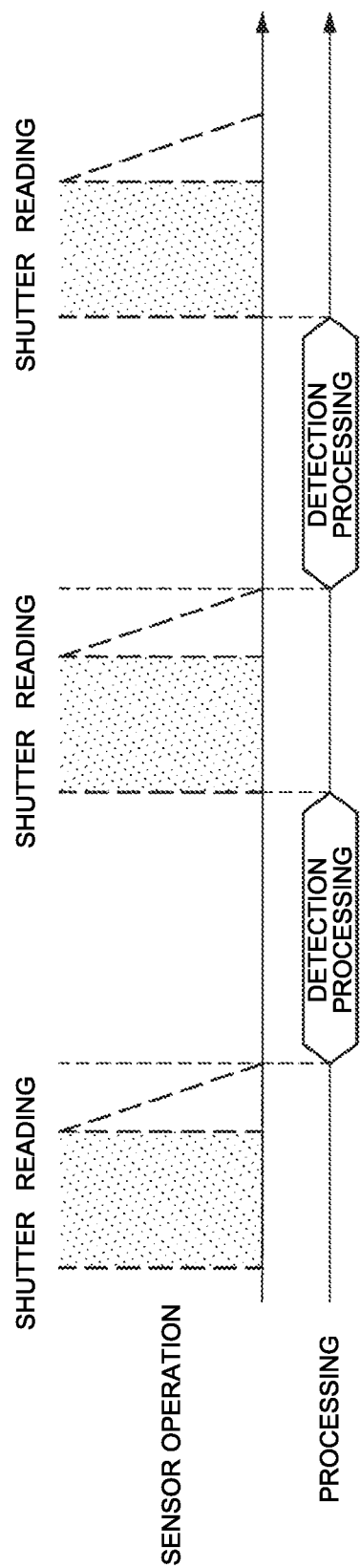
FIG. 9B is an explanatory diagram for describing an operation example of the solid imaging apparatus 1.

FIG. 9A and FIG. 9B are explanatory diagrams for describing operation examples of the solid imaging apparatus 1. Among the sensor operations in FIG. 9A, those illustrated with broken lines are shutters and reading operations for detecting an object to be detected, and those illustrated with solid lines are shutters and reading operations when such object to be detected is present. In the following similar drawings, those illustrated as sensor operations represent shutters and reading operations from the top row to the bottom row of pixels.

Detection of an object does not require use of all pixels, and reading operations that are limited to a part of rows or areas may be performed. Accordingly, the reading operation for detecting the object operates at a higher speed than in the reading operation when the object to be detected is present. Shutters and reading operations for detecting the object will be collectively referred to as the low-resolution reading, and shutters and reading operations when the object to be detected is present will be collectively referred to as the high-resolution reading.

FIG. 9A is an operation example of the solid imaging apparatus 1 that executes the high-resolution reading when an object to be detected is detected in the first detection processing, and executes the low-resolution reading after the high-resolution reading. FIG. 9B is an operation example of the solid imaging apparatus 1 when an object to be detected cannot be detected by the detection processing. It should be noted that, in the following figures, the time required for the low-resolution reading, the high-resolution reading, or the detection processing is merely an example.

When a shutter operation of the solid imaging apparatus 1 is started and image data is obtained after the completion of the detection processing using an image that is imaged by the solid imaging apparatus 1, in both cases of FIG. 9A and FIG. 9B, the shutter operation for the low-resolution reading or the high-resolution reading cannot be executed until the detection processing is completed. In particular, since the high-resolution reading requires a longer operation time as compared with the low-resolution reading, even if an object to be detected is detected as a result of the detection processing, the object may fail to be shown on the image depending on the moving speed of the object despite the high-resolution reading.

Thus, the solid imaging apparatus 1 according to the present embodiment performs the low-resolution reading, and executes the shutter operation for the high-resolution reading while performing the detection processing using data by the low-resolution reading in this manner, by antecedently executing the shutter operation for the high-resolution reading, the solid imaging apparatus 1 according to the present embodiment can shorten the time from the detection of an object to the completion of imaging processing.

Figure 10A:
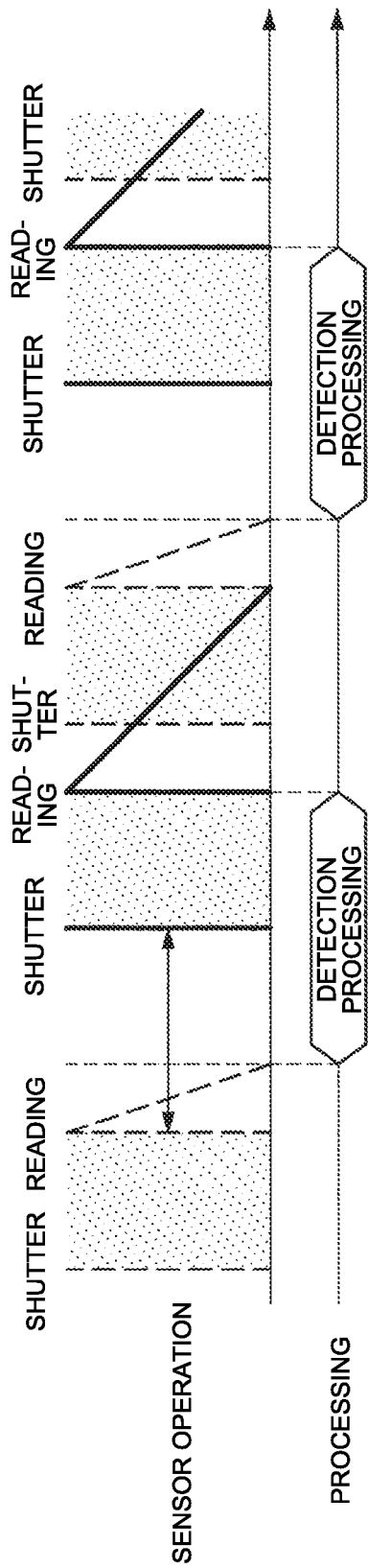
FIG. 10A is an explanatory diagram for describing an operation example of the solid imaging apparatus 1.

FIG. 10A and FIG. 10B are explanatory diagrams for describing operation examples of the solid imaging apparatus 1. FIG. 10A is an operation example of the solid imaging apparatus 1 that executes the high-resolution reading when an object to be detected in the first detection processing is detected, and executes the low-resolution reading after the high-resolution reading. FIG. 10B is an operation example of the solid imaging apparatus 1 when an object to be detected cannot be detected by the detection processing.

As illustrated in FIG. 10A, it is not the case that the solid imaging apparatus 1 according to the embodiment of the present disclosure starts the high-resolution reading only when the detection processing is completed, but the solid imaging apparatus 1 executes the shutter operation for the high-resolution reading during the detection processing, regardless of a detection result by the detection processing.

Furthermore, as illustrated in FIG. 10A, the solid imaging apparatus 1 executes the high-resolution reading if an object to be detected can be detected by the detection processing. As illustrated in FIG. 10A, the solid imaging apparatus 1 further executes the shutter operation for the next detection processing while performing the high-resolution reading.

By contrast, if the object to be detected cannot be detected by the detection processing, as illustrated in FIG. 10B, the solid imaging apparatus 1 starts the shutter operation for the low-resolution reading when the detection processing ends. Since the shutter operation is performed during the detection processing, even if the object to be detected cannot be detected by the detection processing, data accumulated in pixels by the shutter operation does not become useless, and the solid imaging apparatus 1 can use the data in the pixels accumulated by the shutter operation executed during the detection processing for the detection processing as it is.

Figure 11:
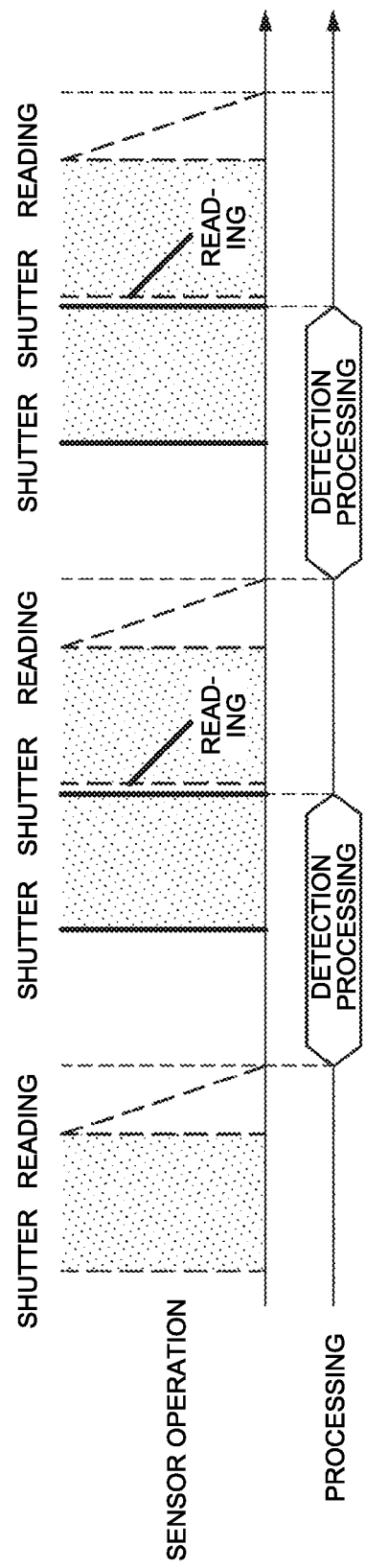
FIG. 11 is an explanatory diagram for describing an operation example of the solid imaging apparatus 1.

When the object to be detected is detected by the detection processing of the object using an image by the low-resolution reading, the solid imaging apparatus 1 may partially perform reading at the time of the high-resolution reading. FIG. 11 is an explanatory diagram for describing an operation example of the solid imaging apparatus 1. In this manner, when detecting the object to be detected, the solid imaging apparatus 1 does not necessarily need to execute reading for all of the rows at the time of the high-resolution reading, but may execute reading partially executed for an area that includes the portion where the object is detected.

In the case of the global shutter method, while the shutter operation is performed for all of the the reading operation can be performed on a part of the pixels. Thus, when the solid imaging apparatus 1 detects the object to be detected by the detection processing of the object using the image by the low-resolution reading, the high-resolution reading may be performed by reading data of the pixels that has not been read in the low-resolution reading. By performing such operations, the solid imaging apparatus 1 can eliminate the time lag between the image for detection and the image imaged with the high-resolution.

FIG. 12 is an explanatory diagram for describing an operation example of the solid imaging apparatus 1. When the object to be detected is detected by the detection processing of the object using the image by the low-resolution reading, the high-resolution reading is performed by reading data of the pixels that has not been read in the low-resolution reading in this case, at the time of the high-resolution reading, the solid imaging apparatus 1 may partially perform reading limited to, for example, an attention area.

Figure 13A:
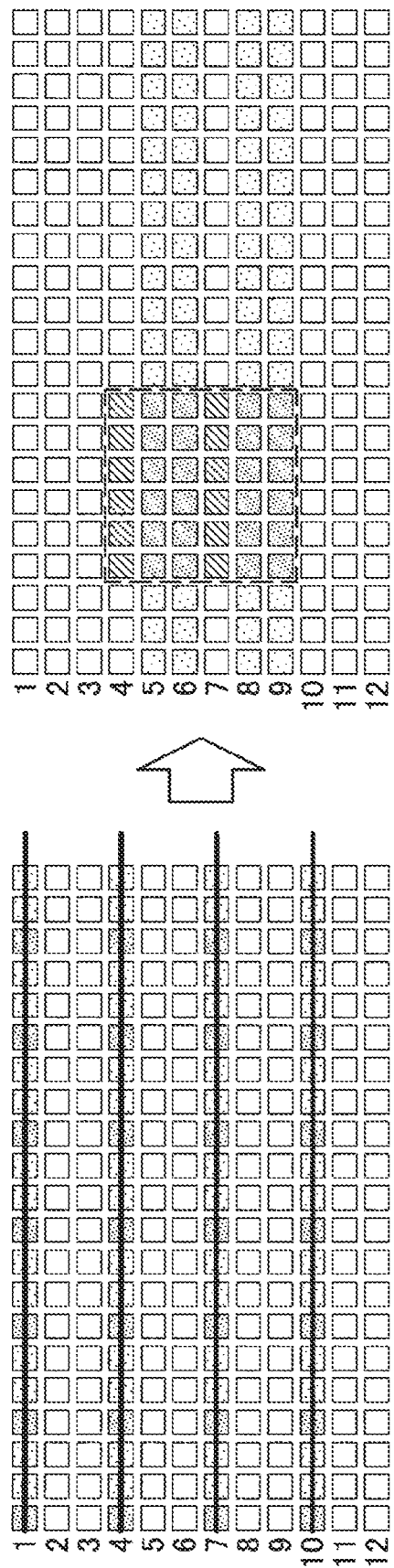
FIG. 13A is an explanatory diagram for describing low-resolution reading and high-resolution reading by the solid imaging apparatus 1.

FIG. 13A and FIG. 13B are explanatory diagrams for describing the low-resolution reading and the high-resolution reading by the solid imaging apparatus 1 according to an embodiment of the present disclosure. FIG. 13A describes the low-resolution reading and the high-resolution reading by the solid imaging apparatus 1 when reading data from pixels in row units, and FIG. 13B describes the low-resolution reading and the high-resolution reading by the solid imaging apparatus 1 when reading data from pixels in pixel units.

If the low-resolution reading by the solid imaging apparatus 1 reads data from pixels in row units as in FIG. 13A, rows that are not read by the low-resolution reading will be the reading targets of the high-resolution reading. In the example of FIG. 13A, the first row, the fourth row, the seventh row, and the tenth row are the rows read by the low-resolution reading. Accordingly, the reading targets of the high-resolution reading will be rows other than those rows. At that time, the solid imaging apparatus 1 may execute the high-resolution reading limited to an attention area. For example, if the attention area is from the fourth row to the ninth row, the solid imaging apparatus 1 sets the fifth row, the sixth row, the eighth row, and the ninth row as the reading targets of the high resolution reading.

In this manner, when setting rows that are not read by the low-resolution reading as the reading targets of the high-resolution reading, the solid imaging apparatus 1 performs interpolating processing on the rows read by the low-resolution reading by using information on the pixels read by the high-resolution reading.

If the low-resolution reading of the solid imaging apparatus reads data from pixels in pixel units as in FIG. 13B, pixels that are not read by the low-resolution reading are the reading targets of the high-resolution reading. In the example of FIG. 13B, the low-resolution reading is performed for one out of every three pixels in both the vertical direction and the lateral direction. Accordingly, the solid imaging apparatus 1 reads pixels that have not been read by the low-resolution reading, by the high-resolution reading. At that time, the solid imaging apparatus 1 may execute the high-resolution reading limited to an attention area, as in the case mentioned above.

If data is read from pixels in pixel units as in FIG. 13B, the solid imaging apparatus 1 may perform reading using only green pixels at the time of the low-resolution reading. This is because it is enough to provide luminance information to detect the object.

In this manner, when the pixels that have not been read by the low-resolution reading are to be read by the high-resolution reading, the solid imaging apparatus 1 performs interpolating processing on the pixels read by the low-resolution reading using information on pixels read by the high-resolution reading. By reading data from pixels in pixel units as in FIG. 13B, the solid imaging apparatus 1 can further facilitate interpolating processing at the time of the high-resolution reading.

<2. Summary>

As has been described above, the embodiments of the present disclosure provide the solid imaging apparatus 1 that performs the low-resolution reading, and executes the shutter operation for the high-resolution reading during the execution of the detection processing using data by the low-resolution reading. In this manner, by antecedently executing the shutter operation for the high-resolution reading, the solid imaging apparatus 1 according to the present embodiment can shorten the time from the detection of the object to the completion of imaging processing.

The steps of the processing executed by the apparatus in the present specification are not necessarily required to be processed in time series according to the orders described in the sequence chart or flowchart. For example, the steps of the processing executed by the apparatus may be processed in orders different from the orders described in the flowchart, or may be processed in parallel.

In addition, it is also possible to create a computer program that allows hardware such as CPU, ROM, and RAM built in the apparatus to exert functions equivalent to those in a corresponding configuration of the apparatus mentioned above. Furthermore, a storage medium that stores therein the computer program can also be provided. Moreover, a series of pieces of processing can also be achieved with hardware by configuring the functional blocks illustrated in the respective functional block diagrams as hardware.

While preferable embodiments of the present disclosure have been described above in detail with reference to the attached drawings, the technical scope of the present disclosure is not limited thereto. It is obvious that those skilled in the technical field of the present disclosure could have conceived of various changes or modifications within the scope of the technical ideas described in the claims, and it is understood that those changes or modifications also reasonably belong to the technical scope of the present disclosure.

Furthermore, the effects described in the present specification are merely explanations or exemplifications, and are not limiting. In other words, the techniques according to the present disclosure may exert other effects that are obvious to those skilled in the art from the descriptions of the present specification, along with the above-described effects or instead of the above-described effects.

Configurations below also belong to the technical scope of the present disclosure.

(1)

A solid imaging apparatus, comprising a control unit that controls a shutter operation for a pixel area having a plurality of pixels arranged in matrix, and a reading operation from the pixel area at a first reading speed and a second reading speed, wherein the control unit starts the shutter operation for at least one row of the pixel area after the reading operation at the first reading speed is completed, and during execution of detection processing of an object read from the pixel area by the reading operation at the first reading speed.

(2)

The solid imaging apparatus according to (1), wherein, when a certain object is detected by the detection processing, the control unit continues the started shutter operation, and starts the reading operation at the second reading speed.

(3)

The solid imaging apparatus according to (2), wherein the control unit starts the reading operation for only a part of the pixel area when starting the reading operation at the second reading speed.

(4)

The solid imaging apparatus according to (3), wherein the control unit starts the reading operation for an area that includes an area where an object to be detected is detected by the detection processing.

(5)

The solid imaging apparatus according to (1), wherein, when a certain object is not detected by the detection processing, the control unit stops the started shutter operation, and starts the shutter operation for the pixel area and the reading operation at the first reading speed.

(6)

The solid imaging apparatus according to any one of (1) to (5), wherein the control unit controls the shutter operation for the pixel area by a method of sequentially exposing each row of pixels.

(7)

The solid imaging apparatus according to (1), wherein the control unit controls the shutter operation for the pixel area by a method of exposing all of the rows of pixels at once.

(8)

The solid imaging apparatus according to (7), wherein, when a certain object is detected by the detection processing, the control unit starts the reading operation at the second reading speed for pixels that are not read by the reading operation at the first reading speed.

(9)

The solid imaging apparatus according to (8), wherein the control unit starts the reading operation for only a part of the pixel area when starting the reading operation at the second reading speed.

(10)

The solid imaging apparatus according to (9), wherein the control unit starts the reading operation for an area that includes an area where an object to be detected is detected by the detection processing.

(11)

The solid imaging apparatus according to any one of (1) to (11), wherein the first reading speed is higher than the second reading speed.

(12)

The solid imaging apparatus according to any one of (1) to (11), further comprising a detection unit that executes detection processing of an object read from the pixel area by the reading operation at the first reading speed.

(13)

A control method of a solid imaging apparatus, comprising the steps of causing a processor to:

control a shutter operation for a pixel area having a plurality of pixels arranged in matrix, and a reading operation from the pixel area at a first reading speed; and start the shutter operation for at least one row of the pixel area during the detection processing of an object that is read from the pixel area, and control a reading operation from the pixel area at a second reading speed.

(14)
A computer program for causing a computer to:
control a shutter operation for a pixel area having a plurality of pixels arranged in matrix, and a reading operation from the pixel area at a first reading speed; and
start the shutter operation for at least one row of the pixel area during the execution of the detection processing of an object that is read from the pixel area, and control a reading operation from the pixel area at a second reading speed.

REFERENCE SIGNS LIST 1 solid imaging apparatus
100 imaging apparatus
110 signal processing unit
120 display unit
130 storage unit

The invention claimed is:

1. A solid imaging apparatus, comprising:
a control circuit that controls a shutter operation for a pixel area having a plurality of pixels arranged in matrix, and a reading operation from the pixel area at a first reading speed and a second reading speed,
wherein the control circuit starts the shutter operation for at least one row of the pixel area after the reading operation at the first reading speed is completed, and during execution of detection processing of an object read from the pixel area by the reading operation at the first reading speed.

2. The solid imaging apparatus according to claim 1, wherein, when a certain object is detected by the detection processing, the control circuit continues the started shutter operation, and starts the reading operation at the second reading speed.

3. The solid imaging apparatus according to claim 2, wherein the control circuit starts the reading operation for only a part of the pixel area when starting the reading operation at the second reading speed.

4. The solid imaging apparatus according to claim 3, wherein the control circuit starts the reading operation for the part of the pixel area that includes an area where an object to be detected is detected by the detection processing.

5. The solid imaging apparatus according to claim 1, wherein, when a certain object is not detected by the detection processing, the control circuit stops the started shutter operation, and starts the shutter operation for the pixel area and the reading operation at the first reading speed.

6. The solid imaging apparatus according to claim 1, wherein the control circuit controls the shutter operation for the pixel area by a method of sequentially exposing each row of pixels.

7. The solid imaging apparatus according to claim 1, wherein the control circuit controls the shutter operation for the pixel area by a method of exposing all of the rows of pixels at once.

8. The solid imaging apparatus according to claim 7, wherein, when a certain object is detected by the detection processing, the control circuit starts the reading operation at the second reading speed for pixels that are not read by the reading operation at the first reading speed.

9. The solid imaging apparatus according to claim 8, wherein the control circuit starts the reading operation for only a part of the pixel area when starting the reading operation at the second reading speed.

10. The solid imaging apparatus according to claim 9, wherein the control circuit starts the reading operation for an area that includes an area where an object to be detected is detected by the detection processing.

11. The solid imaging apparatus according to claim 1, wherein the first reading speed is higher than the second reading speed.

12. The solid imaging apparatus according to claim 1, further comprising a detection processor that executes detection processing of an object read from the pixel area by the reading operation at the first reading speed.

13. A control method of a solid imaging apparatus, comprising the steps of causing a processor to:
control a shutter operation for a pixel area having a plurality of pixels arranged in matrix, and a reading operation from the pixel area at a first reading speed; and
start the shutter operation for at least one row of the pixel area during execution of detection processing of an object that is read from the pixel area, and control a reading operation from the pixel area at a second reading speed.

14. A non-transitory computer readable medium storing program code, the program code being executable by a computer to perform operations comprising:
controlling a shutter operation for a pixel area having a plurality of pixels arranged in matrix, and a reading operation from the pixel area at a first reading speed; and
starting the shutter operation for at least one row of the pixel area during execution of detection processing of an object that is read from the pixel area, and control a reading operation from the pixel area at a second reading speed.

15. The non-transitory computer readable medium according to claim 14, wherein, when a certain object is detected by the detection processing, the started shutter operation continues, and starts the reading operation at the second reading speed.

16. The non-transitory computer readable medium according to claim 15, wherein the reading operation is started for only a part of the pixel area when controlling the reading operation at the second reading speed.

17. The non-transitory computer readable medium according to claim 16, wherein the reading operation is started for the part of the pixel area that includes an area where an object to be detected is detected by the detection processing.

18. The non-transitory computer readable medium according to claim 15, wherein, when a certain object is not detected by the detection processing, the started shutter operation is stopped, and the shutter operation for the pixel area and the reading operation are started at the first reading speed.

19. The non-transitory computer readable medium according to claim 15, wherein the shutter operation for the pixel area is controlled by a method of sequentially exposing each row of pixels.

20. The non-transitory computer readable medium according to claim 15, wherein the shutter operation for the pixel area is controlled by a method of exposing all of the rows of pixels at once.

* * * * *